(12) United States Patent
Uensal et al.

(10) Patent No.: US 8,168,105 B2
(45) Date of Patent: May 1, 2012

(54) POLYMER MEMBRANE, METHOD FOR THE PRODUCTION AND USE THEREOF

(75) Inventors: Oemer Uensal, Mainz (DE); Joachim Kiefer, Losheim am See (DE); Jochen Baurmeister, Eppstein (DE); Jürgen Pawlik, Frankfurt (DE); Werner Kraus, Niedernhausen (DE); Frauke Jordt, Eppstein (DE)

(73) Assignee: BASF Fuel Cell GmbH, Frankfurt (DE)

( * ) Notice: Subject to any disclaimer, the term of this patent is extended or adjusted under 35 U.S.C. 154(b) by 0 days.

(21) Appl. No.: 12/720,026

(22) Filed: Mar. 9, 2010

(65) Prior Publication Data

US 2010/0164148 A1    Jul. 1, 2010

Related U.S. Application Data

(60) Continuation of application No. 10/468,385, filed on Jun. 21, 2004, now abandoned, and a division of application No. 11/931,734, filed on Oct. 31, 2007, now abandoned.

(30) Foreign Application Priority Data

Mar. 1, 2001   (DE) .................................. 101 09 829

(51) Int. Cl.
*B29D 7/00* (2006.01)
(52) U.S. Cl. ........................................ 264/216; 425/535
(58) Field of Classification Search .................... 264/216
See application file for complete search history.

(56) References Cited

U.S. PATENT DOCUMENTS

| | | | |
|---|---|---|---|
| 3,541,199 A | 11/1970 | Thomas et al. |
| 4,191,618 A | 3/1980 | Coker et al. |
| 4,212,714 A | 7/1980 | Coker et al. |
| 4,333,805 A | 6/1982 | Davidson et al. |
| 4,927,909 A | 5/1990 | Wadhwa et al. |
| 5,403,675 A | 4/1995 | Ogata et al. |
| 5,599,639 A | 2/1997 | Sansone et al. |
| 6,187,231 B1 | 2/2001 | Sansone et al. |
| 2004/0247974 A1 | 12/2004 | Uensal et al. |
| 2007/0102361 A1 | 5/2007 | Kiefer et al. |

FOREIGN PATENT DOCUMENTS

| | | |
|---|---|---|
| EP | 0354040 | 2/1990 |
| EP | 0816415 A2 | 1/1998 |
| WO | WO 0039202 A1 | 7/2000 |

*Primary Examiner* — Yogendra Gupta
*Assistant Examiner* — John Robitaille
(74) *Attorney, Agent, or Firm* — Hammer & Associates, P.C.

(57) ABSTRACT

The present invention relates to an acid-doped polymer membrane based on polyazoles. The acid-doped polymer membrane can be used in a variety of applications because of its excellent mechanical properties and is useful as polymer electrolyte membrane (PEM) in PEM fuel cells. A doped polymer membrane based on polyazoles is obtained by a process comprising the steps of: A) casting a film using a solution of polymers based on polyazoles in a polar, aprotic organic solvent; B) drying the film formed in step A) until it is self-supporting; C) treating the film obtained in step B) with a treatment liquid at a temperature in the range from room temperature to the boiling point of the treatment liquid; D) drying and/or dabbing the film treated according to step C) to remove the treatment liquid from step C); and E) doping the film treated according to step D) with a doping agent.

14 Claims, 2 Drawing Sheets

KF titration results on untreated and treated films

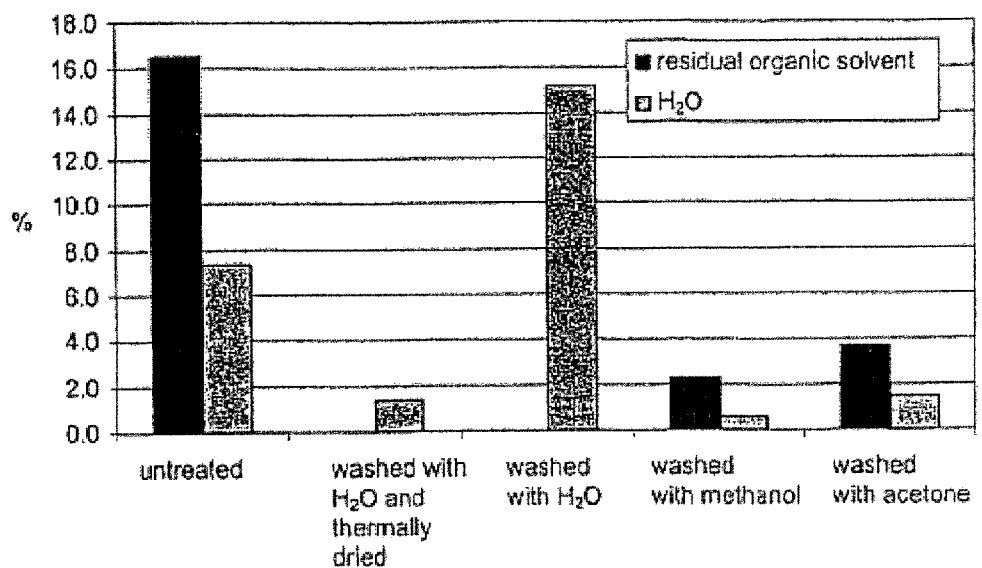
Figure 1: KF titration results on untreated and treated films
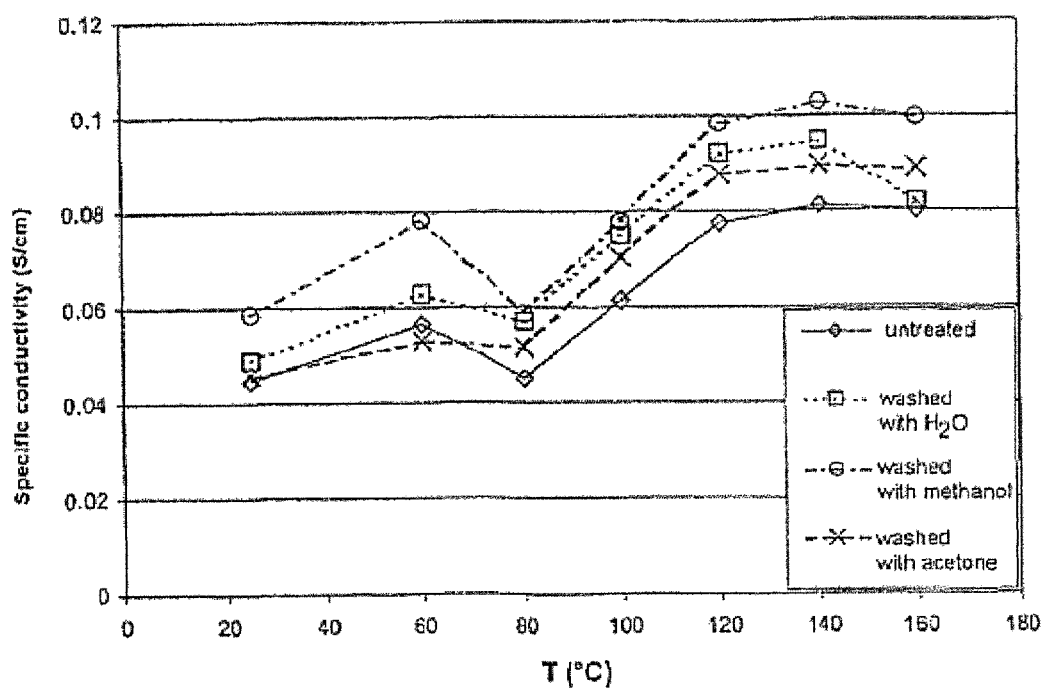
Figure 2: Proton conductivity of the untreated and treated membranes in the range 25-160°C.

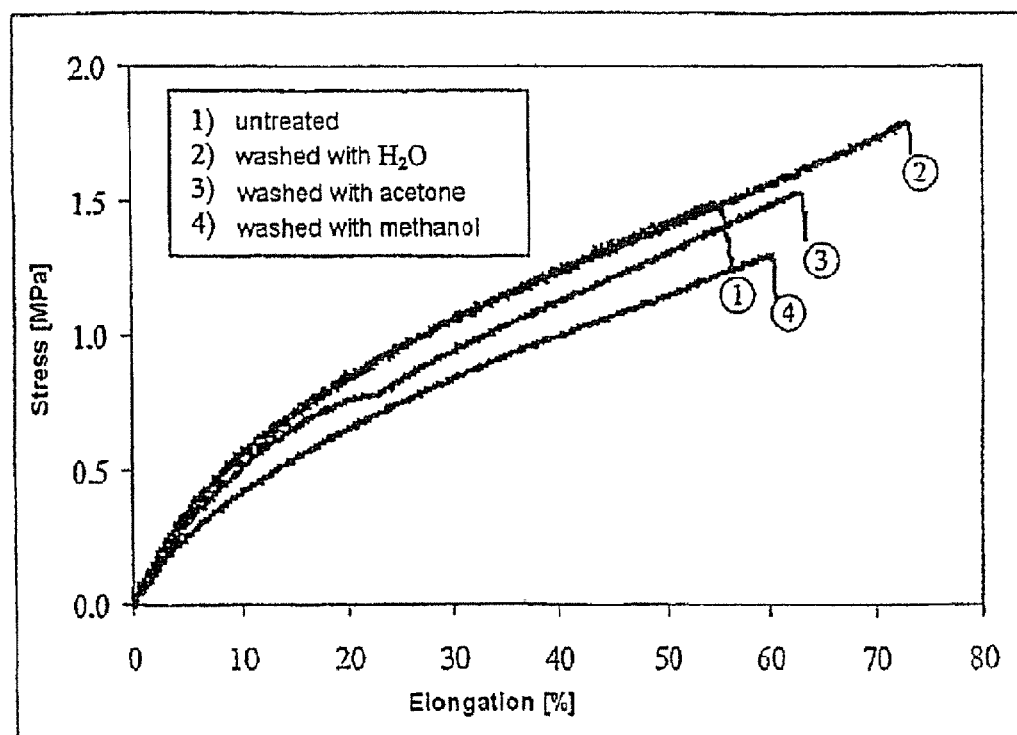
Figure 3: Results of uniaxial tensile tests on treated and untreated membranes

POLYMER MEMBRANE, METHOD FOR THE PRODUCTION AND USE THEREOF

RELATED APPLICATIONS

This case is a continuation of U.S. patent application Ser. No. 10/468,385 filed Jun. 21, 2004, now abandoned, and a division of U.S. patent application Ser. No. 11/931,734 filed Oct. 31, 2007 now abandoned.

BRIEF DESCRIPTION OF THE DRAWINGS

The foregoing will become more readily apparent by referring to the following detailed description and the appended drawings in which:

FIG. 1 is a graph showing the results of the KF filtration;
FIG. 2 is a graph showing proton conductivity;
FIG. 3 is a graph showing the results of tensile strength on the polymer membranes.

DETAILED DESCRIPTION OF THE INVENTION

The present invention relates to an acid-doped polymer membrane based on polyazoles, a process for producing it and its use.

The acid-doped polymer membrane of the invention can be used in a variety of applications because of its excellent chemical, thermal and mechanical properties and is particularly useful as polymer electrolyte membrane (PEM) in PEM fuel cells.

Acid-doped polyazole membranes for use in PEM fuel cells are already known. The basic polyazole membranes are doped with concentrated phosphoric acid or sulfuric acid and act as proton conductors and separators in polymer electrolyte membrane fuel cells (PEM fuel cells).

Due to the excellent properties of the polyazole polymer, such polymer electrolyte membranes can, when processed to produce a membrane-electrode unit (MEE), be used in fuel cells at continuous operating temperatures above 100° C., in particular above 120° C. This high continuous operating temperature allows the activity of the catalysts based on noble metals present in the membrane-electrode unit (MEE) to be increased. Particularly when using reformates from hydrocarbons, significant amounts of carbon monoxide are present in the reformer gas and these usually have to be removed by costly gas treatment or gas purification procedures. The opportunity of increasing the operating temperature enables significantly higher concentrations of CO impurities to be tolerated over the long term.

The use of polymer electrolyte membranes based on polyazole polymers enables, firstly, part of the costly gas treatment or gas purification procedures to be omitted and, secondly, the catalyst loading in the membrane electrode unit to be reduced. Both are indispensible prerequisites for large-scale use of PEM fuel cells, since otherwise the costs of a PEM fuel cell system are too high.

The acid-doped, polyazole-based polymer membranes known hitherto display a favorable property profile. However, owing to the applications sought for PEM fuel cells, in particular in automobile and stationary applications, they still require overall improvement. Furthermore, the polymer membranes known hitherto have a high content of dimethylacetamide (DMAc) which cannot be removed completely by known drying methods.

Thus, the polyazole-based polymer membranes known hitherto still display mechanical properties which are unsatisfactory for the above application after they have been doped with acid. This mechanical instability is reflected in a low modulus of elasticity, a low ultimate tensile strength and a low fracture toughness.

It is an object of the present invention to provide acid-doped polymembranes based on polyazoles which, firstly, have improved mechanical properties and, secondly, have the advantages of the polymer membrane based on polyazoles and allow an operating temperature above 100° C. without additional humidification of the combustion gas.

We have now found that a specific after-treatment of the polyazole-based film to be doped with acid surprisingly leads to doped polymer membranes having improved mechanical properties, with the good proton conductivity being retained or even improved. In addition, the after-treatment rids the membrane of residual organic constituents such as dimethylacetamide (DMAc) which would otherwise reduce the catalyst activity.

The present invention provides a doped polymer membrane based on polyazoles, obtainable by a process comprising the steps A) casting a film using a solution of polymers based on polyazoles in a polar, aprotic organic solvent,
B) drying the film formed in step A) until it is self-supporting,
C) treating the film obtained in step B) with a treatment liquid at a temperature in the range from room temperature to the boiling point of the treatment liquid,
D) drying and/or dabbing the film treated according to step C) to remove the treatment liquid from step C),
E) doping the film treated according to step D) with a doping agent.

The preparation of polymer solutions based on polyazoles has been comprehensively described in the prior art. Thus, EP-A-0816415 describes a method of dissolving polymers based on polyazoles using N,N-dimethylacetamide as polar, aprotic solvent at temperatures above 260° C. A substantially more gentle process for preparing solutions based on polyazoles is disclosed in the German patent application 10052237.8.

As polymers based on polyazoles, preference is given to polymers comprising recurring azole units of the formula (I) and/or (II)

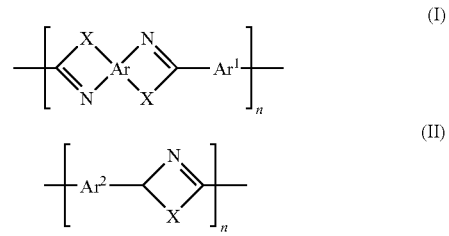

where

Ar are identical or different and are each a tetravalent aromatic or heteroaromatic group which may have one or more rings, $Ar^1$ are identical or different and are each a divalent aromatic or heteroaromatic group which may have one or more rings, $Ar^2$ are identical or different and are each a trivalent aromatic or heteroaromatic group which may have one or more rings, X are identical or different and are each oxygen, sulfur or an amino group which bears a hydrogen atom and a group having 1-20 carbon atoms, preferably a branched or unbranched alkyl or alkoxy group, or an aryl group as other radical.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, anthracene and phenanthrene, all of which may also be substituted.

$Ar^1$ can have any substitution pattern; in the case of phenylene, for example, $Ar^1$ can be ortho-, meta- or para-phenylene. Particularly preferred groups are derived from benzene and biphenylene, each of which may also be substituted.

Preferred alkyl groups are short-chain alkyl groups having from 1 to 4 carbon atoms, e.g. methyl, ethyl, n-propyl or isopropyl and tert-butyl groups.

Preferred aromatic groups are phenyl or naphthyl groups. The alkyl groups and the aromatic groups may be substituted.

Preferred substituents are halogen atoms such as fluorine, amino groups or short-chain alkyl groups such as methyl or ethyl groups.

If polyazoles comprising recurring units of the formula (I) are used for the purposes of the present invention, the radicals X within a recurring unit should be identical.

The polyazoles used according to the invention can in principle also have different recurring units which differ, for example, in their radical X. However, they preferably have only identical radicals X in a recurring unit.

In a preferred embodiment of the present invention, the polymer comprising recurring azole units is a copolymer comprising at least two units of the formula (I) and/or (II) which differ from one another.

In a particularly preferred embodiment of the present invention, the polymer comprising recurring azole units is a polyazole comprising only units of the formula (I) and/or (II).

The number of recurring azole units in the polymer is preferably greater than or equal to 10. Particularly preferred polymers comprise at least one 100 recurring azole units. For the purposes of the present invention, polymers comprising recurring benzimidazole units are preferably used. An example of an extremely advantageous polymer comprising recurring benzimidazole units is represented by the formula (III):

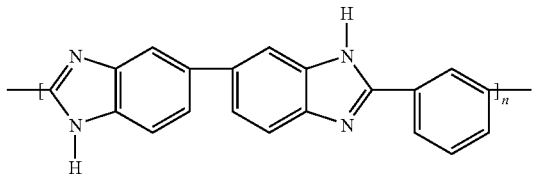

(III)

where n is an integer greater than or equal to 10, preferably greater than or equal to 100.

Casting of a polymer film from a polymer solution according to step A) is carried out by means of measures known per se from the prior art.

Drying of the film in step B) is carried out at temperatures in the range from room temperature to 300° C. Drying is carried out under atmospheric pressure or reduced pressure. The drying time depends on the thickness of the film and is preferably from 10 seconds to 24 hours. The film which has been dried in step B) is subsequently self-supporting and can be processed further. Drying is carried out by means of drying methods customary in the films industry.

As a result of the drying procedure carried out in step B), the polar, aprotic organic solvent is very largely removed. Thus, the residual content of the polar, aprotic organic solvent is usually 10-23%.

A further lowering of the residual solvent content to below 2% by weight can be achieved by increasing the drying temperature and drying time, but this significantly prolongs the subsequent doping of the film, for example with phosphoric acid. A residual solvent content of 5-15% is thus useful for reducing the doping time.

The treatment of the film which has been dried in step B) uses a treatment liquid and is out in the temperature range from room temperature (20° C.) and the boiling point of the treatment liquid at atmospheric pressure.

As treatment liquid for the purposes of the invention and for the purposes of step C.), use is made of solvents which are liquid at room temperature [i.e. 20° C.] selected from the group consisting of alcohols, ketones, alkanes (aliphatic and cycloaliphatic), ethers (aliphatic and cycloaliphatic), esters, carboxylic acids, with the abovementioned group members being able to be halogenated, water, inorganic acids (e.g. $H_3PO_4$, $H_2SO_4$) and mixtures thereof.

Preference is given to using C1-C10 alcohols, C2-C5 ketones, C1-C10-alkanes (aliphatic and cycloaliphatic), C2-C6-ethers (aliphatic and cycloaliphatic), C2-C5 esters, C1-C3 carboxylic acids, dichloromethane, water, anorganic acids (e.g. $H_3PO_4$, $H_2SO_4$) and mixtures thereof.

The treatment liquid introduced in step C) can be removed by means of the drying procedure carried out in step D). The drying procedure depends on the partial vapor pressure of the treatment liquid chosen. Drying is usually carried out at atmospheric pressure and temperatures in the range from 20° C. to 200° C. More gentle drying can also be carried out under reduced pressure. In place of drying, the membrane can also be dabbed to free it of excess treatment liquid in step D). The order is not critical.

In step E), the doping of the film obtained from step C) or D) is carried out. For this purpose, the film is wetted with a doping agent or laid in this. As doping agent for the polymer membrane of the invention, use is made of acids, preferably all known Lewis and BrØnsted acids, in particular inorganic Lewis and BrØnsted acids.

Apart from these abovementioned acids, the use of polyacids, in particular isopolyacids and heteropolyacids, and of mixtures of various acids is also possible. For the purposes of the present invention, heteropolyacids are inorganic polyacids which have at least two different central atoms and are in each case partial mixed anhydrides formed from weak, polybasic oxo acids of a metal (preferably Cr, Mo, V, W) and a nonmetal (preferably As, I, P, Se, Si, Te). They include, inter alfa, 12-molybdophosphoric acid and 12-tungstophosphoric acid.

Doping agents which are particularly preferred for the purposes of the invention are sulfuric acid and phosphoric acid. A very particularly preferred doping agent is phosphoric acid ($H_3PO_4$).

The polymer membranes of the invention are doped. For the purposes of the present invention, doped polymer membranes are polymer membranes which, owing to the presence of doping agents, display increased proton conductivity compared to the undoped polymer membranes.

Processes for preparing doped polymer membranes are known. In a preferred embodiment of the present invention, they are obtained by wetting a film of the polymer concerned with concentrated acid, for example with highly concentrated phosphoric acid, for a suitable time, preferably 5 minutes-96 hours, particularly preferably 1-72 hours, at temperatures in the range from room temperature to 100° C. and atmospheric or super-atmospheric pressure.

The conductivity of the polar membrane of the invention can be influenced via the degree of doping. The conductivity increases with increasing concentration of doping agent until a maximum value has been reached. According to the invention, the degree of doping is reported as mol of acid per mol of recurring units of the polymer. For the purposes of the present invention, a degree of doping of from 3 to 15, in particular from 6 to 12, is preferred.

The polymer membrane of the invention has improved materials properties compared to the previously known doped polymer membranes. In particular, they have very good mechanical properties and perform better than untreated membranes.

The polymer membranes of the invention display improved proton conductivity compared to untreated membranes.

Possible applications of the doped polymer membranes of the invention include, inter alia, use in fuel cells, in electrolysis, in capacitors and in battery systems. Owing to their property profile, the doped polymer membranes are preferably used in fuel cells.

The present invention also relates to a membrane-electrode unit comprising at least one polymer membrane according to the invention. For further information on membrane-electrode units, reference may be made to the specialist literature, in particular the patents U.S. Pat. No. 4,191,618, U.S. Pat. No. 4,212,714 and U.S. Pat. No. 4,333,805. The disclosure in the abovementioned references [U.S. Pat. No. 4,191,618, U.S. Pat. No. 4,212,714 and U.S. Pat. No. 4,333,805] in respect of the structure and production of membrane-electrode units is incorporated by reference into the present description.

The invention is illustrated below by means of examples and a comparative example, without the invention being restricted to these examples.

EXAMPLES

Untreated Film

The untreated films were laid in 85% strength $H_3PO_4$ for 96 hours. Prior to doping with $H_3PO_4$, the $H_2O$ content and residual solvent content of the film are determined by Karl Fischer (KF) titration. The water content of the film is determined directly as follows by KF titration using a Mettler-Toledo apparatus. The sample, which is present in a closed sample vial, is heated to 250° C. and dried at this temperature. The gas liberated in this way is passed directly into a closed titration vessel and analyzed by means of a Karl Fischer [KF] reagent. Apart from the determination of the water content, the residual solvent content is determined by determining the weight before and after drying.

Washing with $H_2O$ and Subsequent Thermal Drying:

The films were boiled in water for 1 hour. The water bath was then changed and the films were boiled for a further hour. The films were subsequently rinsed with fresh water and finally dried at 160° C. for 3 hours. $H_2O$ content and residual solvent content were determined on the treated films by KF titration. The membranes were obtained by doping the films in 85% strength $H_3PO_4$ for 96 hours.

Washing with $H_2O$:

The films were boiled in water for 1 hour. The water bath is then changed and the films are boiled for a further hour. The films were subsequently dabbed with a cloth and used further in moist form. $H_2O$ content and residual solvent content of the film were determined by KF titration. The membranes were doped in 85% strength $H_3PO_4$ for 96 hours.

Washing with Methanol:

The films were placed in methanol and boiled under reflux for 2 hours (beginning when the methanol started to boil). The films were taken out and dried firstly for 1 minute in air minute in air and then at 100° C. under reduced pressure in a drying oven for 2 hours. $H_2O$ content and residual organic solvent content of the film were determined by KF titration. The membranes were doped in 85% strength $H_3PO_4$ for 96 hours.

Washing with Acetone:

The films were placed in acetone and boiled under reflux for 2 hours (beginning when the acetone started to boil). The films were then dried firstly for 1 minute in air at RT and subsequently at 100° C. under reduced pressure in a drying oven for 2 hours. $H_2O$ content and residual solvent content of the film were determined by KF titration. The membranes were doped in 85% strength $H_3PO_4$ for 96 hours.

FIG. 1 shows the result of the KF titration. The residual organic solvent is removed completely by washing with water. The residual organic solvent content is reduced from 16.6% to 3.7 or 2.3% by washing with acetone or with methanol, respectively.

FIG. 2 shows a proton conductivity which is improved by 10% even at room temperature and is retained or improved further at elevated temperature.

The specific conductivity is measured by means of impedance spectroscopy in a 4-pole arrangement in the potentiostatic mode using platinum electrodes (wire, 0.25 mm diameter). The distance between the current collector electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measuring cell is brought to the desired temperature in an oven and the temperature is regulated via a Pt-100 temperature sensor positioned in the immediate proximity of the specimen. After reaching the temperature, the specimen is maintained at this temperature for 10 minutes before commencement of the measurement.

To determine the mechanical properties, uniaxial tensile tests are carried out on tension bars. A Zwick tester equipped with a 100 N load cell and a heatable oven is used for this purpose. The length of specimen between the chucks is 10 cm and the separation velocity is set at 50 mm/min. The deformation is determined directly via the distance of travel. The tensile tests on membranes doped with phosphoric acid are carried out at 100° C. To calculate the stress automatically, the cross section of each specimen is determined and entered before commencement of the test. To determine mean values of modulus of elasticity, tensile strength, elongation at break and rupture energy (toughness), at least 5 measurements are carried out on each membrane.

The results of the tensile tests on the polymer membranes according to the invention compared to untreated membranes are shown by way of example in FIG. 3. It can be seen from the figure that a membrane washed with water has the highest elongaton at break and the highest tensile stress at break.

An untreated membrane displays an elongation at break of 55% while a membrane according to the invention has an elongation at break in the range from 58% to 75%.

The results of the tensile tests are summarized in Table 1.

TABLE 1

Results of the tensile tests on membranes after different washing procedures compared to an untreated membrane.

| Washing Method | E [MPa] | Error in E [MPa] | Tensile strength [MPa] | Error in tensile strength [MPa] | Elongation at break [%] | Error in elongation at break [%] | Rupture energy [kJ/m²] | Error in rupture energy [kJ/m²] |
|---|---|---|---|---|---|---|---|---|
| untreated | 4.7 | 0.7 | 1.5 | 0.13 | 55 | 5 | 54 | 5 |
| washed with water | 5 | 0.55 | 1.7 | 0.25 | 71 | 11 | 74.5 | 18 |
| washed with acetone | 5.45 | 0.4 | 1.55 | 0.14 | 64.7 | 6 | 63 | 8.8 |
| washed with methanol | 5.3 | 0.5 | 1.36 | 0.22 | 61.2 | 13 | 54 | 18.6 |

We claim:

1. A process for producing a doped polymer polyazole membrane comprising the steps of:
    A) casting a film using a solution of polyazole polymers in a polar, aprotic organic solvent;
    B) partially drying the film formed in step A) with heat or under reduced pressure or both until it is self-supporting and forms a partially dried film, said partially dried film having a residual content of said polar, aprotic organic solvent in a range of 10 to 23%;
    C) treating the film obtained in step B) with a treatment liquid at a temperature in the range from 20° C. to the boiling point of the treatment liquid;
    D) removing the treatment liquid from step C) by drying and/or dabbing the film; and
    E) doping the film treated according to step D) with a concentrated doping agent, said concentrated doping agent has a concentration of at least 85 wt % and is selected from the group consisting of: Lewis acids and Brønsted acids; and
    where doping is to a degree from 3 to 15 mol of acid per mol of recurring unit of polymer to obtain a polymer electrolyte membrane.

2. The process of claim 1 where the doping is to a degree from 6 to 12 mols of acid per mol of recurring units of said polymer.

3. The process of claim 1, wherein the polyazole polymer comprises recurring azole units of the formula (I) and/or (II)

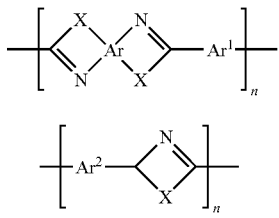

where
    Ar are identical or different and are each a tetravalent aromatic or heteroaromatic group which may have one or more rings,
    Ar1 are identical or different and are each a divalent aromatic or heteroaromatic group which may have one or more rings,
    Ar2 are identical or different and are each a trivalent aromatic or heteroaromatic group which may have one or more rings,
    X are identical or different and are each oxygen, sulfur or an amino group which bears a hydrogen atom and a group having 1-20 carbon atoms, preferably a branched or unbranched alkyl or alkoxy group, or an aryl group as other radical.

4. The process of claim 3, wherein the polymer comprising recurring azole units is a copolymer comprising at least two units of the formula (I) and/or (II) which differ from one another.

5. The process of claim 4, wherein the polyazole consists only of units of the formula (I) and/or (II).

6. The process of claim 1, wherein the polyazole is a polymer comprising recurring benzimidazole units of the formula (III)

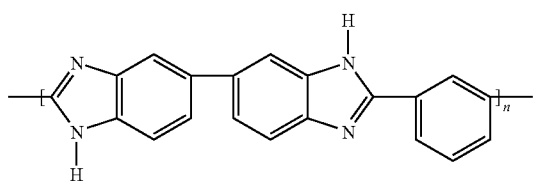

where n is an integer greater than or equal to 10.

7. The process of claim 6 wherein n is an integer greater than or equal to 100.

8. The process of claim 1, wherein doping is performed for 1 to 96 hours at a temperature ranging from 20° C. to 100° C.

9. The process of claim 1 where said doping agent is selected from the group consisting of: inorganic Lewis acids and inorganic Brønsted acids.

10. The process of claim 9 where said doping agent is selected from the group consisting of: sulfuric acid and phosphoric acid.

11. The process of claim 9 where said doping agent phosphoric acid.

12. The process of claim 11 where said phosphoric acid has a concentration of 85%.

13. The process of claim 1 wherein said treatment liquids being selected from the group consisting of: alcohols, ketones, alkanes, ethers, esters, carboxylic acids, halogenated alcohols, halogenated ketones, halogenated alkanes, halogenated ethers, halogenated esters, halogenated carboxylic acids, water, inorganic acids, and mixtures thereof.

14. The process of claim 1 wherein the treated doped membrane having at least a 10% improvement in proton conductivity and/or a 5.5% improvement in elongation at break when compared to an equivalent untreated membrane.

* * * * *